UNITED STATES PATENT OFFICE.

HERMAN E. TRUMBULL, OF PIPESTONE, MINNESOTA.

COMPOUND FOR MAKING PIPESTONE CEMENT.

No. 841,285.     Specification of Letters Patent.     Patented Jan. 15, 1907.

Application filed November 30, 1906. Serial No. 345,722.

*To all whom it may concern:*

Be it known that I, HERMAN E. TRUMBULL, a citizen of the United States, residing at Pipestone, in the county of Pipestone and State of Minnesota, have invented a new and useful Compound for Making Pipestone Cement, of which the following is a specification.

This invention relates to a compound for making cement, and has for its object to provide a cement which may be used as a substitute for plaster-of-paris and similar preparations in repairing the tops of pool and billiard tables and which may also be used as an ornamental covering or veneer for wood, metal, paper, cloth, and the like.

With the above objects in view the invention consists in a compound or cement formed of the following ingredients in the proportions stated, by weight, to wit: Powdered pipestone twelve parts, boiling water four parts, and ground glue one part.

In carrying the invention into effect the pipestone is first reduced by grinding the same in a suitable mill to form a fine powder which is free from grit. The glue is then thoroughly dissolved in the boiling water and the powdered pipestone added, the mixture being thoroughly stirred until the parts are well blended, thus forming a stiff cement having approximately the consistency of putty.

In using the cement as a veneer the same is spread upon the wood, metal, cloth, paper, or other material to be treated and when thoroughly dry is sandpapered and polished, thereby presenting a smooth ornamental surface having the appearance of native pipestone.

In repairing the tops of pool and billiard tables the cement is introduced in the crevices around the screw heads or joints and allowed to set, or, if desired, the entire top of the table may be covered with a thin veneer of the cement.

Cement prepared in the manner stated will not become mealy or soft or break loose from the slate or other backing and will take a high polish when dry.

If desired, the cement may be colored by incorporating therewith a suitable pigment during the formation of the compound, so that any desired color of cement may be produced at will.

Having thus described the invention, what is claimed is—

1. The herein-described cement the same consisting of powdered pipestone, glue, and water.

2. The herein-described cement the same consisting of the following ingredients in the proportions stated by weight; powdered pipestone twelve parts, boiling water four parts and ground glue one part.

In testimony that I claim the foregoing as my own I have hereto affixed my signature in the presence of two witnesses.

HERMAN E. TRUMBULL.

Witnesses:
    P. J. McGORTY,
    LUKE BROWN.